United States Patent
Chen et al.

(10) Patent No.: US 11,163,485 B2
(45) Date of Patent: Nov. 2, 2021

(54) INTELLIGENTLY CHOOSING TRANSPORT CHANNELS ACROSS PROTOCOLS BY DRIVE TYPE

(71) Applicant: International Business Machines Corporation, Armonk, NY (US)

(72) Inventors: Jing Lan Chen, Shanghai (CN); Ning Ding, Shanghai (CN); Yao Dong Zhang, Shanghai (CN); Xu Chu Jiang, Shanghai (CN); Zhi Zhi Huang, Shanghai (CN); Wei Feng Yang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 16/541,254

(22) Filed: Aug. 15, 2019

(65) Prior Publication Data

US 2021/0048957 A1   Feb. 18, 2021

(51) Int. Cl.
*G06F 12/00* (2006.01)
*G06F 3/06* (2006.01)

(52) U.S. Cl.
CPC .......... *G06F 3/0655* (2013.01); *G06F 3/0607* (2013.01); *G06F 3/0653* (2013.01); *G06F 3/0685* (2013.01)

(58) Field of Classification Search
CPC .... G06F 3/0655; G06F 3/0607; G06F 3/0653; G06F 3/0685
See application file for complete search history.

(56) References Cited

U.S. PATENT DOCUMENTS

| | | | |
|---|---|---|---|
| 7,889,661 B2 | 2/2011 | Lee | |
| 8,719,445 B2 | 5/2014 | Ko | |
| 8,838,887 B1* | 9/2014 | Burke | G06F 3/0611 711/112 |
| 9,513,814 B1* | 12/2016 | Can | G06F 3/0649 |
| 9,983,795 B1* | 5/2018 | Naamad | G06F 3/0629 |
| 10,146,446 B1 | 12/2018 | Anchi | |
| 10,289,958 B1* | 5/2019 | Tzur | G06F 3/0685 |
| 2002/0026549 A1* | 2/2002 | Powers | H04L 43/00 710/104 |
| 2004/0057448 A1* | 3/2004 | Nakamura | H04L 49/90 370/428 |
| 2005/0066045 A1 | 3/2005 | Johnson | |
| 2007/0088737 A1* | 4/2007 | Kawakami | G06F 21/50 |
| 2008/0104081 A1* | 5/2008 | Mimatsu | G06F 16/10 |
| 2010/0094847 A1 | 4/2010 | Malan | |
| 2011/0004722 A1* | 1/2011 | Jeddeloh | G06F 13/16 711/103 |
| 2011/0271061 A1* | 11/2011 | Shimada | G06F 3/0607 711/154 |
| 2012/0198152 A1* | 8/2012 | Terry | G06F 11/1092 711/114 |

(Continued)

*Primary Examiner* — Shawn X Gu
*Assistant Examiner* — Mohammad S Hasan
(74) *Attorney, Agent, or Firm* — Donald G. Weiss

(57) ABSTRACT

In an approach to intelligently choosing transport channels across protocols by drive type, one or more transport channels on a host are detected. One or more storage drive tiers on a target are detected. The one or more transport channels are mapped to the one or more storage drive tiers, based on performance. A transfer of a data between a host and the target is completed, using each transport channel and each storage drive tier.

20 Claims, 5 Drawing Sheets

(56) References Cited

U.S. PATENT DOCUMENTS

| | | | |
|---|---|---|---|
| 2014/0185429 A1* | 7/2014 | Takase | H04L 45/30 |
| | | | 370/225 |
| 2015/0074299 A1* | 3/2015 | Maniwa | G06F 3/0608 |
| | | | 710/74 |
| 2015/0324126 A1 | 11/2015 | Nakajima | |
| 2016/0308774 A1* | 10/2016 | Astigarraga | H04L 43/0817 |
| 2018/0157429 A1 | 6/2018 | Venkat | |
| 2018/0356992 A1* | 12/2018 | Lamberts | G06F 3/0685 |
| 2019/0097789 A1* | 3/2019 | Rangayyan | G06F 21/602 |
| 2019/0155512 A1* | 5/2019 | Tenner | H04L 67/1097 |
| 2019/0238412 A1* | 8/2019 | Vohra | G06F 3/0604 |
| 2019/0332275 A1* | 10/2019 | Jin | G06F 11/2092 |
| 2019/0339903 A1* | 11/2019 | Ainscow | G06F 3/0685 |
| 2020/0042228 A1* | 2/2020 | Roberts | G06F 3/0683 |
| 2020/0050384 A1* | 2/2020 | Gupta | G06F 3/0635 |
| 2020/0356498 A1* | 11/2020 | Shtivelman | G06F 13/1668 |

* cited by examiner

| Pclass0 | Pclass1 | Pclass2 | Pclass3 | Pclass4 |
|---------|---------|---------|---------|---------|
| Ltier0 | | Lteir1 | Ltier2 | Ltier3 |

FIG. 4A

| Pclass0 | Pclass1 | Pclass2 | Pclass3 | Pclass4 | |
|---------|---------|---------|---------|---------|---|
| Lteir0 | Lteir1 | Ltier2 | Ltier3 | Ltier4 | Ltier5 |

FIG. 4B

INTELLIGENTLY CHOOSING TRANSPORT CHANNELS ACROSS PROTOCOLS BY DRIVE TYPE

BACKGROUND

The present invention relates generally to the field of data processing, and more particularly to intelligently choosing transport channels across protocols by drive type.

In addition to the growth of traditional forms of data in the field of data processing, today there are significant trends driving the generation of new forms of data, including various types of artificial intelligence, the Internet of Things, connected vehicles, higher resolution audio-visual entertainment, etc. By all accounts, data is growing at an accelerating rate, and is now close to doubling in size every year. A recent report claimed that 12 zettabytes of data (1 zettabyte=1 trillion gigabytes) was created in 2016, and the amount of data created is projected to reach 175 zettabytes by 2023. Fueled by massive growth in data creation, the state of data storage hardware is evolving at a rapid rate. Much of the innovation occurring today is tied to solid state flash drives and non-volatile memory technologies, but existing electro-mechanical storage media like spinning disk drives have maintained a precarious foothold.

SUMMARY

Embodiments of the present invention disclose a method, a computer program product, and a system for intelligently choosing transport channels across protocols by drive type. In one embodiment, one or more transport channels on a host are detected. One or more storage drive tiers on a target are detected. The one or more transport channels are mapped to the one or more storage drive tiers, based on performance. A transfer of a data between a host and the target is completed, using each transport channel and each storage drive tier.

BRIEF DESCRIPTION OF THE DRAWINGS

FIG. 4A is a table depicting a sample right-aligned protocol and volume LBA tier table for the host multipathing program and the storage target program in accordance with an embodiment of the present invention.

FIG. 4B is a table depicting a sample left-aligned protocol and volume LBA tier table for the host multipathing program and the storage target program in accordance with an embodiment of the present invention.

DETAILED DESCRIPTION

With the explosive growth in the amount and usage of data in modern data processing systems, new methods are needed to increase the throughput and reduce the latency of data transfer between the host and storage in modern systems. In a typical system, there are multiple transport channels and protocols co-existing in one storage system, which may include Non-Volatile Memory express (NVMe) Remote Direct Memory Access (NVMe-RDMA), Nonvolatile memory express over Fiber Channel (NVMe-FC), Fiber Channel-to-Small Computer System Interface (FC-SCSI), Fiber Channel over Ethernet (FCoE), Internet Small Computer Systems Interface (iSCSI), etc. In addition, other transport channels and protocols will likely be developed in the future, adding to the number of transport channels in a data processing system.

Typically there are different disk pools (fast flash drives, slower serial advanced technology attachment (SATA) drives, etc.) on the same storage array, and the ever-increasing demands for storage will lead to the development of more drive types. These disk pools are arranged in tiers, with the highest tiers containing the fastest, lowest latency, and highest cost devices, which are typically used for the most critical or most frequently used data, and the lowest tiers containing the slowest, highest latency, and lowest cost devices, which are typically used for archiving and long-term storage. Existing systems may utilize multipath communications between the host and the storage system and storage pool/drive tiers to improve performance. But there are no multipath communications across transport channel/protocols, nor is there any end to end transport channel/protocol class by drive tier. The present invention describes a system that utilizes existing transport resources in multiple paths across transport channels and protocols by drive type to provide end to end multipath transport over channel/protocol class by drive tier.

Figure 1:
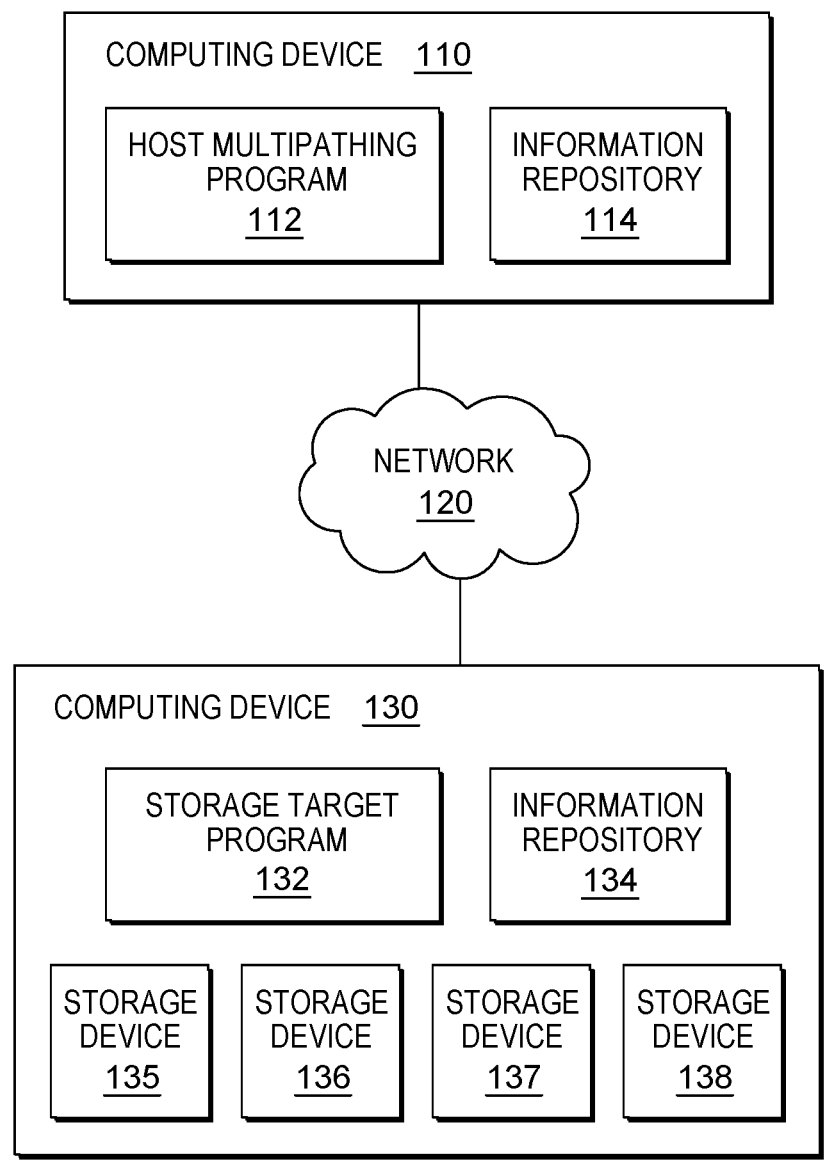
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of host multipathing program 112 and storage target program 132 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and computing device 130, both connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110, computing device 130, and other computing devices (not shown) within distributed data processing environment 100.

Computing device 110 and computing device 130 can each be a standalone computing device, a management server, a web server, a mobile computing device, or any other electronic device or computing system capable of receiving, sending, and processing data. In an embodiment, computing device 110 and computing device 130 can each be a personal computer, a desktop computer, a laptop computer, a netbook computer, a tablet computer, a smart phone, or any programmable electronic device capable of communicating with other computing devices (not shown) within distributed data processing environment 100 via network 120. In another embodiment, computing device 110 and computing device 130 can each represent a server computing system utilizing multiple computers as a server system, such as in a cloud computing environment. In yet another embodiment, computing device 110 and computing device 130 each represent a computing system utilizing clustered computers and components (e.g., database server computers, application server computers, etc.) that act as a single pool of seamless resources when accessed within distributed data processing environment 100.

In an embodiment, computing device 110 is the host initiator for transfers to and from computing device 130. In an embodiment, computing device 130 is the target storage system for transfers to and from computing device 110.

In an embodiment, there are different types of transport channels and protocols between the host initiator, e.g., computing device 110, and the target storage system, e.g., computing device 130. These transport channels may include, for example, NVMe-RDMA, NVMe-FC, FC-SCSI, FCoE, and iSCSI. In an embodiment, the target storage system consists of one or more storage tiers, each storage tier containing one or more storage devices, where each storage device may be of a different drive type, for example, fast NVMe drives, other SSD and flash drives, and slower rotating drives, including SCSI and SATA drives.

In an embodiment, computing device 110 includes host multipathing program 112. In an embodiment, host multipathing program 112 is a program, application, or subprogram of a larger program for intelligently choosing transport channels across protocols by drive type. In an alternative embodiment, host multipathing program 112 may be located on any other device accessible by computing device 110 via network 120.

In an embodiment, computing device 110 includes information repository 114. In an embodiment, information repository 114 may be managed by host multipathing program 112. In an alternate embodiment, information repository 114 may be managed by the operating system of computing device 110, alone, or together with, host multipathing program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 may include transport channel and protocol data, protocol class data, drive type and drive tier data, link connection data, transport channel tables, raw data to be transferred between the host initiator and target storage system, other data that is received by host multipathing program 112 from one or more sources, and data that is created by host multipathing program 112.

In an embodiment, computing device 130 includes storage target program 132. In an embodiment, storage target program 132 is a program, application, or subprogram of a larger program for intelligently choosing transport channels across protocols by drive type. In an alternative embodiment, storage target program 132 may be located on any other device accessible by computing device 130 via network 120.

In an embodiment, computing device 130 includes information repository 134. In an embodiment, information repository 134 may be managed by storage target program 132. In an alternate embodiment, information repository 134 may be managed by the operating system of computing device 130, alone, or together with, storage target program 132. Information repository 134 is a data repository that can store, gather, compare, and/or combine information. In some embodiments, information repository 134 is located externally to computing device 130 and accessed through a communication network, such as network 120. In some embodiments, information repository 134 is stored on computing device 130. In some embodiments, information repository 134 may reside on another computing device (not shown), provided that information repository 134 is accessible by computing device 130. Information repository 134 may include transport channel and protocol data, protocol class data, drive type and drive tier data, link connection data, transport channel tables, raw data to be transferred between the host initiator and storage target, other data that is received by storage target program 132 from one or more sources, and data that is created by storage target program 132.

Information repository 114 and information repository 134 may each be implemented using any volatile or non-volatile storage media for storing information, as known in the art. For example, information repository 114 and information repository 134 may each be implemented with a tape library, optical library, one or more independent hard disk drives, multiple hard disk drives in a redundant array of independent disks (RAID), SATA drives, solid-state drives (SSD), or random-access memory (RAM). Similarly, information repository 114 and information repository 134 may each be implemented with any suitable storage architecture known in the art, such as a relational database, an object-oriented database, or one or more tables.

In an embodiment, computing device 130 may include storage device 135, storage device 136, storage device 137, and storage device 138. In an embodiment, storage device 135, storage device 136, storage device 137, and storage device 138 may be internal to information repository 134. In another embodiment, storage device 135, storage device 136, storage device 137, and storage device 138 may be external to information repository 134. In an embodiment, storage device 135, storage device 136, storage device 137, and storage device 138 can each be one or more independent hard disk drives, multiple hard disk drives in a redundant array of independent disks (RAID), solid-state drives (SSD), or random-access memory (RAM). In an embodiment, storage device 135, storage device 136, storage device 137, and storage device 138 may communicate via different transport channels (not shown) which may include NVMe-RDMA, NVMe-FC, FC-SCSI, FCoE, iSCSI, or any other appropriate transport channel known by those skilled in the art.

Figure 2:
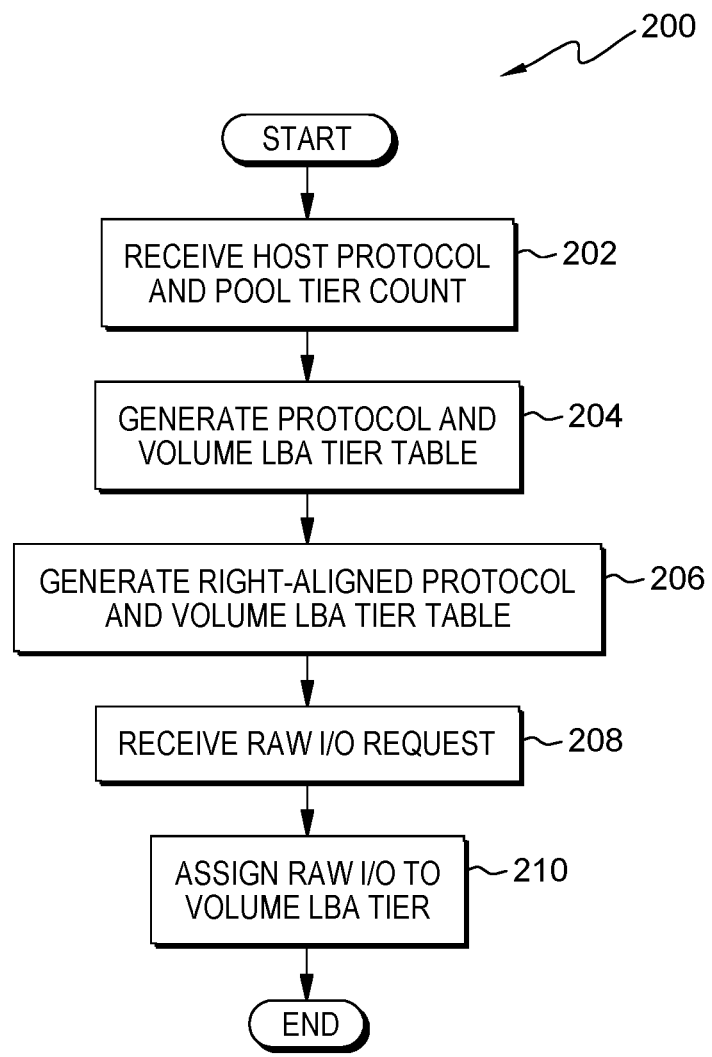
FIG. 2 is a flowchart depicting operational steps of a host multipathing program, on a computing device within the distributed data processing environment of FIG. 1, for intelligently choosing transport channels across protocols by drive type.

FIG. 2 is a flow chart diagram of workflow 200 depicting operational steps for host multipathing program 112 for intelligently choosing transport channels across protocols by drive type. In an embodiment, the drive types are arranged in storage pool tiers, where each storage pool tier contains one drive type. In an embodiment, host multipathing program 112 receives a host protocol and a pool tier count. In an embodiment, host multipathing program 112 generates a protocol and volume logical block addressing (LBA) tier table. In an embodiment, host multipathing program 112 generates an aligned protocol and volume LBA tier table. In an embodiment, host multipathing program 112 receives a raw input/output (I/O) request. In an embodiment, host multipathing program 112 assigns the raw I/O request to a volume LBA tier.

In an alternative embodiment, the steps of workflow 200 may be performed by any other program while working with host multipathing program 112. It should be appreciated that embodiments of the present invention provide at least for determining existing transport resources between the host initiator and target storage system and initiating a multipath transfer to use all the available transport resources. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Host multipathing program 112 receives host protocol and pool tier count (step 202). At step 202, host multipathing program 112 receives a count of the host connect protocols, storage pool tiers, and the number of drives in each of the pool tiers from storage target program 132 (step 304 in FIG. 3).

Host multipathing program 112 generates protocol and volume LBA tier table (step 204). At step 204, host multipathing program 112 uses the count of the host connect protocols and storage pool tiers from storage target program 132 to generate a protocol and volume LBA tier table to map one or more host protocol classes (Pclasses) to each of the one or more storage pool LBA tiers (Ltiers). In an embodiment, host multipathing program 112 generates the protocol and volume LBA tier table based on the capacity of each LBA tier. In an embodiment, multipathing program 112 defines the transport channel/protocol class by drive tier, for example, assigning a fast transport channel for a fast drive tier. In an embodiment, host multipathing program 112 divides a volume of the target storage system to a tiered LBA block based on storage pool tier number. In an embodiment, host multipathing program 112 defines the LBA block based on the pool tier capacity and number of drives. In an embodiment, host multipathing program 112 adjusts the protocol and volume LBA tier table when either the number of tiers or the number of drives changes, for example, by adjusting the drive count in the Ltiers when a drive in one of the tiers goes offline.

Host multipathing program 112 generates aligned protocol and volume LBA tier table (step 206). In an embodiment, host multipathing program 112 creates an ordered list of the host protocol classes, ordering the list from the highest performance protocol class to the lowest performance protocol class. In an embodiment, host multipathing program 112 creates an ordered list of the storage pool tiers, ordering the list from the highest performance storage pool tier to the lowest performance storage pool tier. In an embodiment, host multipathing program 112 generates the aligned protocol and volume LBA tier table by correlating the ordered list of the host protocol classes with the ordered list of the storage pool tiers, such that the highest performance host protocol class correlates to the highest performance storage pool tier.

In an embodiment, when the number of Pclasses is not equal to the number of Ltiers, host multipathing program 112 correlates the protocol and volume LBA tier table by aligning the Pclasses with the Ltiers, depending on whether the number of Pclasses or the number of Ltiers is greater. FIG. 4A depicts a sample right-aligned protocol and volume LBA tier table for the host multipathing program and the storage target program in accordance with an embodiment of the present invention. The table is right-aligned when the number of Pclasses is more than the number of Ltiers. The table is right-aligned in order that data from the highest performance host protocol will be mapped to the highest performance volume LBA tier. Since there are more Pclasses than Ltiers, data from Pclass0 and Pclass1 are both mapped to Ltier0, which is the highest performance storage tier. By right-aligning the protocol and volume LBA tier table, it assures that the highest performance Pclasses are always mapped to the highest performance Ltier, and that all Pclasses are utilized to maximize throughput.

FIG. 4B depicts a sample left-aligned protocol and volume LBA tier table for the host multipathing program and the storage target program in accordance with an embodiment of the present invention. The table is left-aligned when the number of Pclasses is less than the number of Ltiers. The table is left-aligned in order that data from the highest performance host protocol will be mapped to the highest performance volume LBA tier. Since there are fewer Pclasses than Ltiers, the lowest performance storage tier, Ltier5, is not mapped to a Pclass, since doing so would not increase, and might decrease, throughput.

Host multipathing program 112 receives a raw input/output (I/O) request (step 208). In step 208, host multipathing program 112 receives a raw I/O request from a user on computing device 110 to transfer data to or from information repository 134. In an embodiment, when host multipathing program 112 receives a raw I/O request to transfer data to or from information repository 134, host multipathing program 112 analyzes the running load on information repository 134. In an embodiment, host multipathing program 112 adjusts the load to maximize throughput and minimize latency based on the analysis of the load currently running on information repository 134. In an embodiment, host multipathing program 112 adjusts the message queue lengths for the different transport channels to balance the load between the channels. In an embodiment, host multipathing program 112 constantly monitors the status of the raw I/O request and adjusts the usage of the Ltiers to balance the load across all tiers.

Host multipathing program 112 assigns the raw I/O request to volume LBA tiers (step 210). In an embodiment, host multipathing program 112 assigns the raw I/O request to one or more specific transport channels from the protocol and volume LBA tier table based on the analysis of the running load from step 208. In an embodiment, host multipathing program 112 will concurrently use all existing transport channel/protocols between initiator and target, computing device 110 and computing device 130, respectively.

In an embodiment, host multipathing program 112 assigns the raw I/O request to the highest performance Ltier in the protocol and volume LBA tier table. In another embodiment, host multipathing program 112 assigns the raw I/O request to the Ltier with the highest availability in the protocol and volume LBA tier table based on the current load as determined in step 208. In an embodiment, host multipathing program 112 assigns the raw I/O request to any number of available Ltiers to maximize the throughput and minimize the latency of the data transfer.

Figure 3:
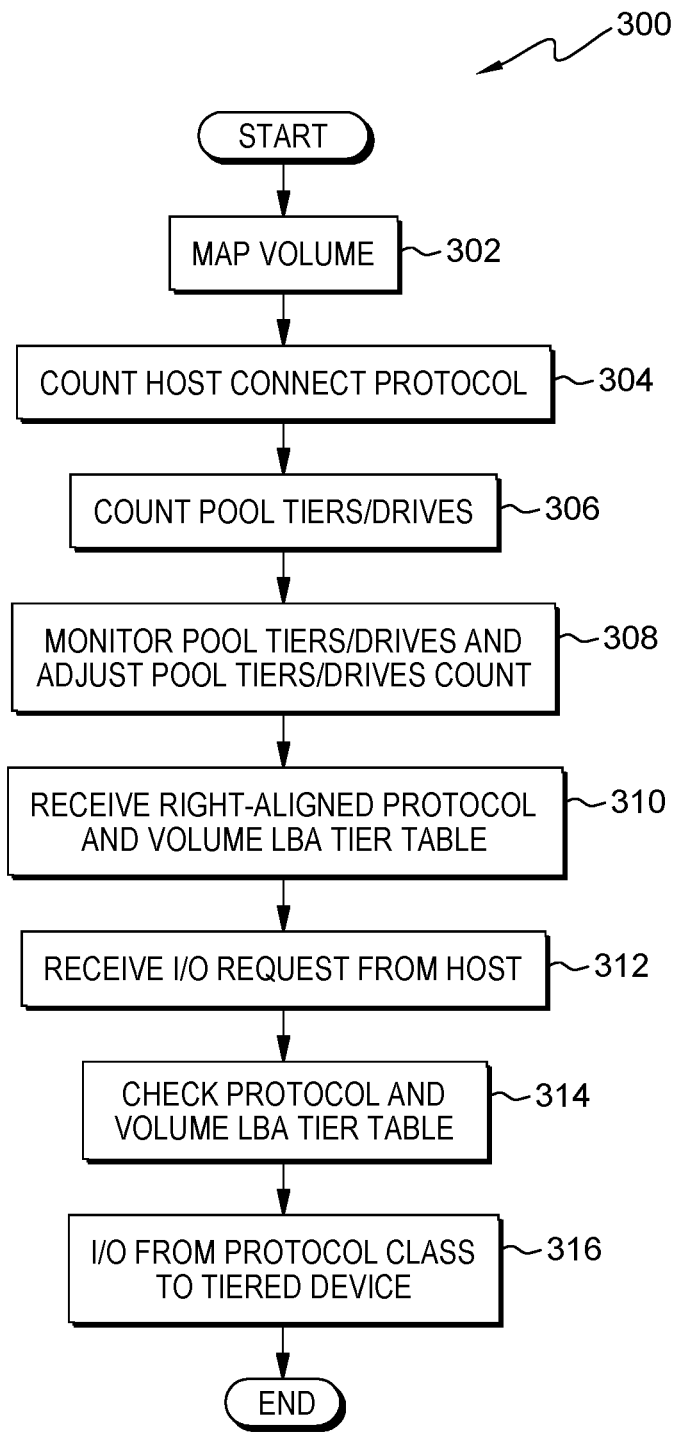
FIG. 3 is a flowchart depicting operational steps of a storage target program, on a computing device within the distributed data processing environment of FIG. 1, for intelligently choosing transport channels across protocols by drive type.

FIG. 3 is a flow chart diagram of workflow 300 depicting operational steps for storage target program 132 for intelligently choosing transport channels across protocols by drive type. In an embodiment, storage target program 132 maps a volume to host multipathing program 112. In an embodiment, storage target program 132 counts host connect protocols, monitors link connection status, and adjusts the host protocol count. In an embodiment, storage target program 132 counts the number of storage pool tiers and the number of drives in the pool tiers. In an embodiment, storage target program 132 monitors the storage pool tiers/drives and adjusts the storage pool tiers/drives count. In an embodiment, storage target program 132 receives the aligned protocol and volume LBA tier table. In an embodiment, storage target program 132 receives a raw I/O request from host multipathing program 112. In an embodiment, storage target program 132 checks the aligned protocol and volume LBA tier table. In an embodiment, storage target program 132 performs the I/O transfer from protocol class to tiered device. In an alternative embodiment, the steps of workflow 300 may be performed by any other program while working with storage target program 132. It should be appreciated that embodiments of the present invention provide at least for determining all existing transport resources between the host initiator and storage target and initiating a multipath transfer to use all the available transport resources. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Storage target program 132 maps volume (step 302). At step 302, storage target program 132 creates a volume from the target storage system, for example, computing device 130, maps the volume, and sends the mapping to host multipathing program 112. In an embodiment, storage target program 132 assigns these drive types to appropriate transport channels, and assigns different host initiator names and different device path names to the mapped volume. For example, for an NVMe-FC transport channel, storage target program 132 assigns the host initiator name NQN, and assigns the device path name/dev/nvme0n1 to the channel.

Storage target program 132 counts host connect protocols (step 304). At step 304, storage target program 132 counts the available host connect protocols and sends the count to host multipathing program 112. In an embodiment, storage target program 132 monitors the link connection status of the available host connect protocols. In an embodiment, in response to changes in the link connection status, storage target program 132 adjusts the count of the available host connect protocols and sends the updated counts to host multipathing program 112.

Storage target program 132 counts pool tiers/drives (step 306). In step 306, storage target program 132 counts the number of storage pool tiers and the number of drives in each of the storage pool tiers. In an embodiment, storage target program 132 sends the count of the number of storage pool tiers and the number of drives in each of the storage pool tiers to host multipathing program 112.

Storage target program 132 monitors storage pool tiers/drives and adjusts storage pool tiers/drives count (step 308).

In an embodiment, storage target program 132 constantly monitors the number of storage pool tiers and the number of drives in the storage pool tiers. In an embodiment, storage target program 132 adjusts the count as necessary, for example, if a drive goes offline or a link connection disconnects from the host initiator. In an embodiment, storage target program 132 sends the adjusted count of the number of storage tiers and the number of drives in the storage tiers to host multipathing program 112.

Storage target program 132 receives the right-aligned protocol and volume LBA tier table (step 310). At step 310, storage target program 132 receives the aligned protocol and volume LBA tier table from host multipathing program 112 (step 206 in FIG. 2).

Storage target program 132 receives a raw I/O request from host multipathing program 112 (step 312). In step 312, storage target program 132 receives a raw I/O request from host multipathing program 112 (step 210 in FIG. 2) to transfer data to or from information repository 134.

Storage target program 132 checks the protocol and volume LBA tier table (step 314). In an embodiment, storage target program 132 checks the volume LBA of the raw I/O request in the aligned protocol and volume LBA tier table received from host multipathing program 112.

Storage target program 132 performs the raw I/O transfer from protocol class to tiered device (step 316). At step 316, storage target program 132 sends the raw I/O transfer to the tiered device based on the aligned protocol and volume LBA tier table with the corresponding protocol/channel class table entry.

Figure 5:
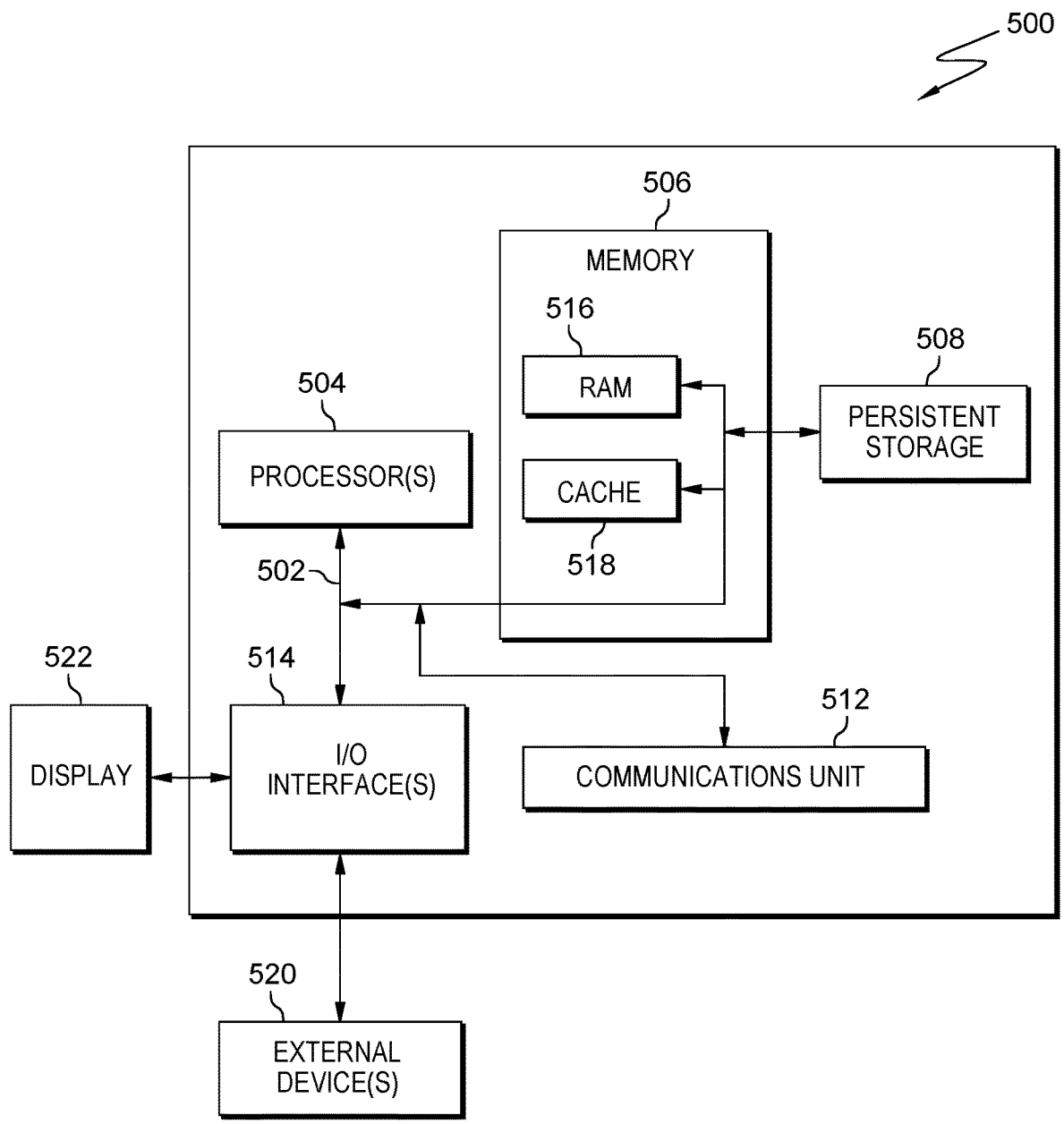
FIG. 5 depicts a block diagram of components of the computing devices executing the storage target program and the host multipathing program within the distributed data processing environment of FIG. 1, in accordance with an embodiment of the present invention.

FIG. 5 is a block diagram depicting components of computing device 110 and computing device 130 suitable for host multipathing program 112 and storage target program 132, respectively, in accordance with at least one embodiment of the invention. FIG. 5 displays the computer 500, one or more processor(s) 504 (including one or more computer processors), a communications fabric 502, a memory 506 including, a random-access memory (RAM) 516, and a cache 518, a persistent storage 508, a communications unit 512, I/O interfaces 514, a display 522, and external devices 520. It should be appreciated that FIG. 5 provides only an illustration of one embodiment and does not imply any limitations with regard to the environments in which different embodiments may be implemented. Many modifications to the depicted environment may be made.

As depicted, the computer 500 operates over the communications fabric 502, which provides communications between the computer processor(s) 504, memory 506, persistent storage 508, communications unit 512, and input/output (I/O) interface(s) 514. The communications fabric 502 may be implemented with an architecture suitable for passing data or control information between the processors 504 (e.g., microprocessors, communications processors, and network processors), the memory 506, the external devices 520, and any other hardware components within a system. For example, the communications fabric 502 may be implemented with one or more buses.

The memory 506 and persistent storage 508 are computer readable storage media. In the depicted embodiment, the memory 506 comprises a RAM 516 and a cache 518. In general, the memory 506 can include any suitable volatile or non-volatile computer readable storage media. Cache 518 is a fast memory that enhances the performance of processor(s) 504 by holding recently accessed data, and near recently accessed data, from RAM 516.

Program instructions for host multipathing program 112 and storage target program 132 may be stored in the persistent storage 508, or more generally, any computer readable storage media, for execution by one or more of the respective computer processors 504 via one or more memories of the memory 506. The persistent storage 508 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

The communications unit 512, in these examples, provides for communications with other data processing systems or devices. In these examples, the communications unit 512 includes one or more network interface cards. The communications unit 512 may provide communications through the use of either or both physical and wireless communications links. In the context of some embodiments of the present invention, the source of the various input data may be physically remote to the computer 500 such that the input data may be received, and the output similarly transmitted via the communications unit 512.

The I/O interface(s) 514 allows for input and output of data with other devices that may be connected to computer 500. For example, the I/O interface(s) 514 may provide a connection to external device(s) 520 such as a keyboard, a keypad, a touch screen, a microphone, a digital camera, and/or some other suitable input device. External device(s) 520 can also include portable computer readable storage media such as, for example, thumb drives, portable optical or magnetic disks, and memory cards. Software and data used to practice embodiments of the present invention, e.g., host multipathing program 112 and storage target program 132, can be stored on such portable computer readable storage media and can be loaded onto persistent storage 508 via the I/O interface(s) 514. I/O interface(s) 514 also connect to a display 522.

Display 522 provides a mechanism to display data to a user and may be, for example, a computer monitor. Display 522 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for choosing transport channels, the computer-implemented method comprising the steps of:

detecting, by one or more computer processors, a plurality of transport channels on a host, wherein each of the plurality of transport channels include a host protocol;

detecting, by the one or more computer processors, a plurality of storage drive tiers on a target, wherein each storage drive tier of the plurality of storage drive tiers includes a drive type, and wherein each storage drive tier of the plurality of storage drive tiers contains one or more storage devices;

mapping, by the one or more computer processors, the plurality of transport channels to the plurality of storage drive tiers, based on performance, wherein the plurality of transport channels are between the host and the storage drive tiers on the target; and completing, by the one or more computer processors, a transfer of a data between the host and the target, using each transport channel of the plurality of transport channels and each storage drive tier of the plurality of storage drive tiers in the transfer of the data, wherein the transfer of data is based on the mapping of the plurality of transport channels to the plurality of storage drive tiers, and further wherein the transfer includes each transport channel of the plurality of transport channels and each storage drive tier of the plurality of storage drive tiers.

2. The computer-implemented method of claim 1, wherein mapping the plurality of transport channels to the plurality of storage drive tiers further comprises:

creating, by the one or more computer processors, an ordered list of the plurality of transport channels, wherein the plurality of transport channels are ordered from a highest performance transport channel to a lowest performance transport channel;

creating, by the one or more computer processors, an ordered list of the plurality of storage drive tiers, wherein the plurality of storage drive tiers are ordered from a highest performance storage drive tier to a lowest performance storage drive tier; and responsive to a number of transport channels is greater than a number of storage drive tiers, correlating, by the one or more computer processors, the ordered list of the plurality of transport channels with the ordered list of the plurality of storage drive tiers to generate a table, wherein the highest performance transport channel is aligned with the highest performance storage drive tier, and further wherein one or more excess transport channels are mapped to the lowest performance storage drive tier.

3. The computer-implemented method of claim 1, further comprising:

monitoring, by the one or more computer processors, the transfer of the data between the host and the target;

analyzing, by the one or more computer processors, a load on each transport channel of the plurality of transport channels; and dynamically adjusting, by the one or more computer processors, the load on each transport channel of the plurality of transport channels based on an analysis of a currently running load on each transport channel, wherein the currently running load is adjusted to maximize throughput to the target.

4. The computer-implemented method of claim 1, further comprising:

monitoring, by the one or more computer processors, the transfer of the data between the host and the target;

analyzing, by the one or more computer processors, a load on each storage drive tier of the plurality of storage drive tiers; and dynamically adjusting, by the one or more computer processors, the load on each storage drive tier of the plurality of storage drive tiers based on an analysis of a currently running load on each storage drive tier of the plurality of storage drive tiers, wherein the currently running load is adjusted to maximize throughput to the target.

5. The computer-implemented method of claim 1, wherein mapping the plurality of transport channels to the plurality of storage drive tiers, based on the performance, further comprises:

monitoring, by the one or more computer processors, a number of active storage drive tiers of the plurality of storage drive tiers; and adjusting, by the one or more computer processors, a host protocol and storage tier table based on the number of active storage drive tiers of the plurality of storage drive tiers, wherein the host protocol and storage tier table comprises the mapping of the plurality of transport channels to the plurality of storage drive tiers, and further wherein the mapping is based on the performance.

6. The computer-implemented method of claim 1, wherein mapping the plurality of transport channels to the plurality of storage drive tiers further comprises:

monitoring, by the one or more computer processors, a number of active storage devices of the one or more storage devices in each storage drive tier of the plurality of storage drive tiers; and adjusting, by the one or more computer processors, a host protocol and storage tier table based on the number of active storage devices of the one or more storage devices in each storage drive tier of the plurality of storage drive tiers, wherein the host protocol and storage tier table comprises the mapping of the plurality of transport channels to the plurality of storage drive tiers.

7. The computer-implemented method of claim 1, wherein mapping the plurality of transport channels to the plurality of storage drive tiers further comprises:

monitoring, by the one or more computer processors, a number of active transport channels of the plurality of transport channels; and adjusting, by the one or more computer processors, a host protocol and storage tier table based on the number of active transport channels of the plurality of transport channels, wherein the host protocol and storage tier table comprises the mapping of the plurality of transport channels to the plurality of storage drive tiers.

8. A computer program product for choosing transport channels, the computer program product comprising:

one or more computer readable storage devices and program instructions stored on the one or more computer readable storage devices, the stored program instructions comprising:

program instructions to detect a plurality of transport channels on a host, wherein each of the plurality of transport channels include a host protocol;

program instructions to detect a plurality of storage drive tiers on a target, wherein each storage drive tier of the plurality of storage drive tiers includes a drive type, and wherein each storage drive tier of the plurality of storage drive tiers contains one or more storage devices;

program instructions to map the plurality of transport channels to the plurality of storage drive tiers, based on performance, wherein the plurality of transport channels are between the host and the storage drive tiers on the target; and program instructions to complete a transfer of a data between the host and the target, using each transport channel of the plurality of transport channels and each storage drive tier of the plurality of storage drive tiers in the transfer of the data, wherein the transfer of data is based on the mapping of the plurality of transport channels to the plurality of drive tiers, and further wherein the transfer includes each transport channel of the plurality of transport channels and each storage drive tier of the plurality of storage drive tiers.

9. The computer program product of claim 8, wherein program instructions to map the plurality of transport channels to the plurality of storage drive tiers further comprises:

program instructions to create an ordered list of the plurality of transport channels, wherein the plurality of transport channels are ordered from a highest performance transport channel to a lowest performance transport channel;

program instructions to create an ordered list of the plurality of storage drive tiers, wherein the plurality of storage drive tiers are ordered from a highest performance storage drive tier to a lowest performance storage drive tier; and responsive to a number of transport channels is greater than a number of storage drive tiers, program instructions to correlate the ordered list of the plurality of transport channels with the ordered list of the plurality of storage drive tiers to generate a table, wherein the highest performance transport channel is aligned with the highest performance storage drive tier, and further wherein one or more excess transport channels are mapped to the lowest performance storage drive tier.

10. The computer program product of claim 8, further comprising:

program instructions to monitor the transfer of the data between the host and the target;

program instructions to analyze a load on each of the plurality of transport channels; and program instructions to dynamically adjust the load on each transport channel of the plurality of transport channels based on an analysis of a currently running load on each transport channel, wherein the currently running load is adjusted to maximize throughput to the target.

11. The computer program product of claim 8, further comprising:

program instructions to monitor the transfer of the data between the host and the target;

program instructions to analyze a load on each storage drive tier of the plurality of storage drive tiers; and program instructions to dynamically adjust the load on each storage drive tier of the plurality of storage drive tiers based on an analysis of a currently running load on each storage drive tier of the plurality of storage drive tiers, wherein the currently running load is adjusted to maximize throughput to the target.

12. The computer program product of claim 8, wherein mapping the plurality of transport channels to the plurality of storage drive tiers, based on the performance, further comprises:

program instructions to monitor a number of active storage drive tiers of the plurality of storage drive tiers; and program instructions to adjust a host protocol and storage tier table based on the number of active storage drive tiers of the plurality of storage drive tiers, wherein the host protocol and storage tier table comprises the mapping of the plurality of transport channels to the plurality of storage drive tiers, and further wherein the mapping is based on the performance.

13. The computer program product of claim 8, wherein mapping the plurality of transport channels to the plurality of storage drive tiers further comprises:

program instructions to monitor a number of active storage devices of the one or more storage devices in each storage drive tier of the plurality of storage drive tiers; and program instructions to adjust a host protocol and storage tier table based on the number of active storage devices of the one or more storage devices in each storage drive tier of the plurality of storage drive tiers, wherein the host protocol and storage tier table comprises the mapping of the plurality of transport channels to the plurality of storage drive tiers.

14. The computer program product of claim 8, wherein mapping the plurality of transport channels to the plurality of storage drive tiers further comprises:

program instructions to monitor a number of active transport channels of the plurality of transport channels; and program instructions to adjust a host protocol and storage tier table based on the number of active transport channels of the plurality of transport channels, wherein the host protocol and storage tier table comprises the mapping of the plurality of transport channels to the plurality of storage drive tiers.

15. A computer system for choosing transport channels, the computer system comprising:

one or more computer processors;

one or more computer readable storage media; and program instructions stored on the one or more computer readable storage media for execution by at least one of the one or more computer processors, the stored program instructions comprising:

program instructions to detect a plurality of transport channels on a host, wherein each of the plurality of transport channels include a host protocol;

program instructions to detect a plurality of storage drive tiers on a target, wherein each storage drive tier of the plurality of storage drive tiers includes a drive type, and wherein each storage drive tier of the plurality of storage drive tiers contains one or more storage devices;

program instructions to map the plurality of transport channels to the plurality of storage drive tiers, based on performance, wherein the plurality of transport channels are between the host and the storage drive tiers on the target; and program instructions to complete a transfer of a data between the host and the target, using each transport channel of the plurality of transport channels and each storage drive tier of the plurality of storage drive tiers in the transfer of the data, wherein the transfer of data is based on the mapping of the plurality of transport channels to the plurality of storage drive tiers, and further wherein the transfer includes each transport channel of the plurality of transport channels and each storage drive tier of the plurality of storage drive tiers.

16. The computer system of claim 15, wherein program instructions to map the plurality of transport channels to the plurality of storage drive tiers further comprises:

program instructions to create an ordered list of the plurality of transport channels, wherein the plurality of transport channels are ordered from a highest performance transport channel to a lowest performance transport channel;

program instructions to create an ordered list of the plurality of storage drive tiers, wherein the plurality of storage drive tiers are ordered from a highest performance storage drive tier to a lowest performance storage drive tier; and responsive to a number of transport channels is greater than a number of storage drive tiers, program instructions to correlate the ordered list of the plurality of transport channels with the ordered list of the plurality of storage drive tiers to generate a table, wherein the highest performance transport channel is aligned with the highest performance storage drive tier, and further wherein one or more excess transport channels are mapped to the lowest performance storage drive tier.

17. The computer system of claim 15, further comprising:

program instructions to monitor the transfer of the data between the host and the target;

program instructions to analyze a load on each of the plurality of transport channels; and program instructions to dynamically adjust the load on each transport channel of the plurality of transport channels based on an analysis of a currently running load on each transport channel, wherein the currently running load is adjusted to maximize throughput to the target.

18. The computer system of claim 15, further comprising:

program instructions to monitor the transfer of the data between the host and the target;

program instructions to analyze a load on each storage drive tier of the plurality of storage drive tiers; and program instructions to dynamically adjust the load on each storage drive tier of the plurality of storage drive tiers based on an analysis of a currently running load on each storage drive tier of the plurality of storage drive tiers, wherein the currently running load is adjusted to maximize throughput to the target.

19. The computer system of claim 15, wherein program instructions to map the plurality of transport channels to the plurality of storage drive tiers, based on the performance, further comprises:

program instructions to monitor a number of active storage drive tiers of the plurality of storage drive tiers; and program instructions to adjust a host protocol and storage tier table based on the number of active storage drive tiers of the plurality of storage drive tiers, wherein the host protocol and storage tier table comprises the mapping of the plurality of transport channels to the plurality of storage drive tiers, and further wherein the mapping is based on the performance.

20. The computer system of claim 15, wherein program instructions to map the plurality of transport channels to the plurality of storage drive tiers further comprises:

program instructions to monitor a number of active storage devices of the one or more storage devices in each storage drive tier of the plurality of storage drive tiers; and program instructions to adjust a host protocol and storage tier table based on the number of active storage devices of the one or more storage devices in each storage drive tier of the plurality of storage drive tiers, wherein the host protocol and storage tier table comprises the mapping of the plurality of transport channels to the plurality of storage drive tiers.

\* \* \* \* \*